United States Patent [19]

Haramaki et al.

[11] Patent Number: 4,902,867
[45] Date of Patent: Feb. 20, 1990

[54] METHOD OF JOINING AN INSULATED WIRE TO A CONDUCTIVE TERMINAL

[75] Inventors: Takashi Haramaki, Toukai; Mitsuo Nakamura, Takahagi; Satoshi Kokura, Ohta; Takao Funamoto, Hitachi; Katsuyoshi Terakado, Urizura, all of Japan

[73] Assignee: Hitachi, Ltd., Tokyo, Japan

[21] Appl. No.: 254,306

[22] Filed: Oct. 6, 1988

[30] Foreign Application Priority Data

Oct. 9, 1987 [JP] Japan .................. 62-253705

[51] Int. Cl.⁴ .......................... B23K 1/02; B23K 11/00
[52] U.S. Cl. .................. 219/85.18; 219/85.22; 219/92
[58] Field of Search .................. 219/85.18, 85.22, 92

[56] References Cited

U.S. PATENT DOCUMENTS

| | | | |
|---|---|---|---|
| 4,359,623 | 11/1982 | Fanning | 219/85.18 X |
| 4,396,819 | 8/1983 | Muchkin et al. | 219/92 X |
| 4,593,172 | 6/1986 | Gneiss | 219/85.18 X |

Primary Examiner—George H. Miller, Jr.
Attorney, Agent, or Firm—Antonelli, Terry & Wands

[57] ABSTRACT

A high heat resisting wire (5) is made of amide-imide-coated wire, and a conductive terminal (4) is made of Cu or Cu alloy such as brass P-containing solder, BAg-1, BAg-2 are used as joining assistant (4). A high heat resisting wire (5) is made of an amide-imide-coated wire and a conductive terminal (3) is made of soft steel or SUS steel, a silver-solder is used as joining assistant (4). A metallic joining conductive layer (8) is formed between a Cu core wire (7) of the insulated wire (5) and the conductive terminal (3) with the joining assistant (4). The insulated wire (5) is joined to the conductive terminal (3) and a joined body having high joining strength can be obtained.

12 Claims, 1 Drawing Sheet

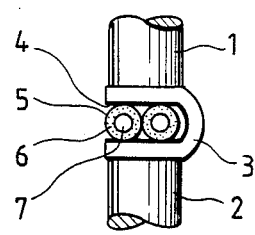
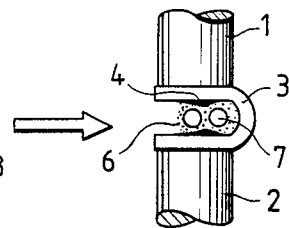
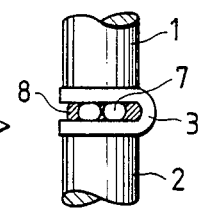
FIG. 1a  FIG. 1b  FIG. 1c
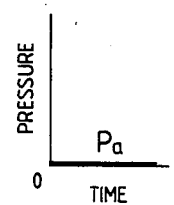
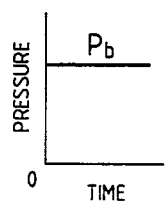
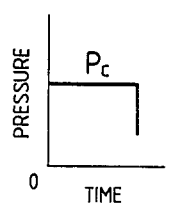
FIG. 2a  FIG. 2b  FIG. 2c
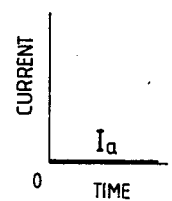
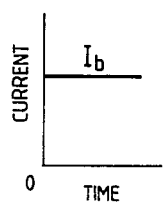
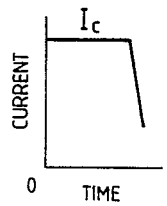
FIG. 3a  FIG. 3b  FIG. 3c
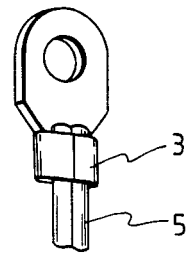
FIG. 4

… …

METHOD OF JOINING AN INSULATED WIRE TO A CONDUCTIVE TERMINAL

BACKGROUND OF THE INVENTION

The present invention relates to a method of joining an insulated wire to a conductive terminal and more particularly to a method of joining suitable for integrally joining an insulated wire as unbare to a conductive terminal and forming a metallic joining conductive layer between a core wire of the insulated wire and the conductive terminal.

The present invention to a method of joining an insulated wire such as a high heat resisting copper wirer relates having heat resisting temperature of 155°–180° C., for example an amide-imide-coated wire, a low heat resisting copper wire having heat resisting temperature of 130° C., for example a polyester-coated wire to a conductive terminal such as Cu, Cu alloy comprising at least one of brass, bronze, Cu-Ni and Cu-Ni-Ag, and soft steel, SUS steel etc..

Thermo-compression connecting has been employed for connecting an insulated wire to a U-shaped conductive terminal as described in Japanese Patent Publication No. 18940/1975.

In this method, a current cannot flow because the insulated wire is covered with an insulating coating. For this reason, the insulated wire was connected to the U-shaped conductive terminal by placing the insulated wire in a U-shaped groove of a previously formed conductive terminal, interposing the conductive terminal between an upper electrode and a lower electrode, pressing the conductive terminal, causing a current to flow in both electrodes to bring about heat buildup in the U-shaped conductive terminal, and carbonizing the insulating coating of the insulated wire by means of the electric heating.

In this method, since a resistance welder is employed, not only resistance welding time is short but also a metallic joining conductive layer is not formed between the core wire of the insulated wire and the conductive terminal. In order to compensate for this drawback, the connection between the core wire of the insulated wire and the conductive terminal was conducted by utilizing calking of the conductive terminal through application of force.

The above-described connecting method through mechanical calking brought about a problem with respect to a remarkable lowering in the fatigue resistance as well as in the electrical properties when the joined body was used for a long period of time.

In the above-described conventional mechanical calking connection method, no consideration was given to the formation of a metallic joining conductive layer between the core wire of the insulated wire and the conductive terminal. Therefore, the conventional connecting method had problems also with respect to the mechanical connecting strength, vibration, and electrical properties derived from the vibration. That is, since the conventional connecting method mainly aims at the removal of an insulating coating of the insulated wire, no metallic joining conductive layer can be attained between the core wire of the insulated wire and the conductive terminal.

Under these circumstances, the present inventors have expected that when a joining assistant which melts during carbonization of the insulating coating of the insulated wire is present around the joining area, the molten joining assistant wets a Cu wire as a core wire of the insulated wire which a clean surface has been exposed through the removal of the insulating coating of the insulated wire and then reacts therewith, thereby attaining a metallic joining conductive layer between the core wire of the insulated wire and the conductive terminal.

Further, the present inventors have made various studies on the kind of the insulating coating of the insulated wire and the joining assistant and, as a result, have found that for example, when the insulated wire is an amide-imide-coated wire, a P-containing solder, BAg-1 (JIS), BAg-2 (JIS), etc. which melt at a temperature of 600° to 750° C. are suitable as the joining assistant.

More specifically, in the present invention, a joining assistant having a melting point corresponding to the carbonization temperature (or the peeling temperature) of the insulating coating of the insulated wire is applied to the conductive terminal, and a metallic joining conductive layer between the core wire of the insulated wire and the conductive terminal is attained simultaneously with the peeling of the insulating coating of the insulated wire.

As an improvement of the above stated thermocompression connecting method, a joining method of the insulated wire to the conductive terminal has been employed in, for example Japanese Patent Laid-Open No. 199575/1986. This joining method is adopted merely for the conductive terminal made of Cu.

In this method, a joining assistant such as Cu-Sn alloy, or Cu-Zn alloy is used for forming as a metallic joining conductive layer between a Cu core wire of an insulated wire and Cu conductive terminal. However, these alloys are joined in general with a flux. Even flux is used, this flux may evaporate during supplied current, the effect according to flux function becomes small. Namely, there can not obtained a joining body having high joining strength.

Further the above stated joining assistant has no element for working as flux therein, accordingly the wetting property of the joining assistant is bad.

SUMMARY OF THE INVENTION

An object of the present invention is to provide a method of joining an insulated wire to a conductive terminal wherein a highly reliable conductor can be obtained by the formation of a metallic joining conductive layer between a core wire of an insulated wire and a conductive terminal.

Another object of the present invention is to provide a method of joining an insulated wire to a conductive terminal wherein a highly joining strength can be obtained by the formation of a metallic joining conductive layer between a core wire of an insulated wire and a conductive terminal.

A further object of the present invention is to provide a method of joining an insulated wire to a conductive terminal wherein a highly vibration resistance can be obtained by the formation of a metallic joining conductive layer between a core wire of an insulated wire and a conductive terminal.

In accordance with the present invention, method of joining an insulated wire to a conductive terminal which comprises placing an insulated wire comprising an insulating coating and a core wire between both sides of a conductive terminal and causing a current to flow between the both sides of the conductive terminal while pressing the conductive terminal after a joining assistant comprising a metal is applied to a joining area of the core wire of the insulated wire or the conductive terminal, the insulating coating of the insulated wire is removed and the joining assistant is melted through electric heating thereby bringing about a metallic joining conductive layer between the core wire of the insulated wire and the conductive terminal.

The conductive terminal comprises Cu alloy, thereby bringing about the metallic joining conductive layer between the core wire of the insulated wire and the Cu alloy conductive terminal.

The joining assistant to be applied is selected from among metals having a melting point corresponding to a temperature for removing the insulating coating of the insulated wire.

When the insulated wire is a high heat resisting wire having Cu core wire, the joining assistant comprises a component having a melting point of 600° to 750° C. selected from among Cu, Ag, Sn, P, Zn, Cd, and Au elements.

The insulated wire is a low heat resisting wire having Cu core wire, the joining assistant comprises a component having a melting point of 280° to 400° C. selected from among Pb, Sn, Ag, Cd, Sb, and Au elements.

The conductive terminal comprises Cu or Cu alloy, the insulated wire is a high heat resisting wire having Cu core wire, the joining assistant comprises a P-containing solder, and thereby bringing about the metallic joining conductive layer between the Cu core wire of the high heat resisting wire and the Cu or Cu alloy conductive terminal. The P-containing solder comprises at least one selected from Ag, Sn, Cu, Zn and Ni. The conductive terminal comprises Cu alloy comprising at least one selected from brass, bronze, Cu-Ni, and Cu-Ni-Ag. The P-containing solder is disposed on the joining area by a method at least one selected from cladding, flame spray, ion injecting and hot dipping, and a film thick of the P-containing solder has about 20–100 μm. The insulated wire is a high heat resisting wire having Cu core wire, the conductive terminal is made of brass, the joining assistant comprises a P-containing solder, and thereby bringing about the metallic joining conductive layer between the Cu core wire of the high heat resisting wire and the brass conductive terminal. The insulated wire is a high heat resisting wire having Cu core wire, the conductive terminal is made of soft steel or SUS steel, the joining assistant comprises a silver solder, and thereby bringing about the metallic joining conductive layer between said Cu core wire of the high heat resisting wire and the steel conductive terminal. The insulated wire is a high heat resisting wire having Cu core wire, the conductive terminal is made of Ni-plated soft steel, the joining assistant comprises a silver solder, and thereby bringing about the metallic joining conductive layer between the Cu core wire of the high heat resisting wire and the steel conductive terminal.

The insulated wire is a high heat resisting wire having Cu core wire, the conductive terminal is made of brass, the joining assistant comprises a Sn-containing solder, and thereby bringing about the metallic joining conductive layer between the Cu core wire of the high heat resisting wire and the brass conductive terminal.

The joining assistant to be applied is selected from among metals. For example, in joining an amide-imide-coated wire having high thermal resistance to a conductive terminal, a preferable joined body can be prepared by using a joining assistant comprising a component having a melting point of 600° to 750° C. selected from among Cu, Ag, Sn, P, Zn, Cd, and Au elements.

On the other hand, in joining a polyester-coated wire having low thermal resistance to a conductive terminal, the present invention can be attained by using a joining assistant comprising a component having a melting point of 280° to 400° C. selected from among Pb, Sn, Ag, Cd, Sb, and Au elements.

A resistance welder is used as a joining device for joining the insulated wire with the conductive terminal in the present invention because it makes possible to conduct heating and pressing simultaneously and to complete joining in a short time. Since joining is conducted in most cases in the atmosphere a shorter joining time serves to reduce a possibility of reaction with the oxygen, which enables the manufacture of an excellent joined body.

In order to further increase the reliability of the metallic joining conductive layer, it is preferred to adopt a two-stage heating and pressing system in the resistance welder.

Specifically, in the first stage of the heating and pressing, the insulating coating of the insulated wire is carbonized and the joining assistant is melted. Subsequently, in the second stage, the carbonized insulating coating of the insulated wire is expelled from the metallic joining conductive layer and, at the same time, the joining assistant sufficiently wets the core wire of the insulated wire and the conductive terminal and an excessive joining assistant is expelled to attain the metallic joining conductive layer between the core wire of the insulated wire and the conductive terminal.

In this case, it is necessary to select the joining assistant according to the kind of the insulating coating of the insulated wire. This is because when the carbonization temperature of the insulating coating of the insulated wire is high, the application of a joining assistant having a low melting point causes the joining assistant to be melted before carbonization of the insulating coating of the insulated wire and to be expelled by pressing, which makes it impossible for the joining assistant to contribute to the formation of the metallic joining conductive layer between the core wire of the insulated wire and the conductive terminal.

Further, in this case, unfavorably an excessive reaction with the conductive terminal proceeds, which leads to the cracking of the bent portion of the conductive terminal.

On the other hand, when a joining assistant having a high melting point is used, the joining assistant will not melt, so that no good joining can be attained. In view of the above, it is apparent that the insulating coating of the insulated wire and the joining assistant should have substantially the same melting point.

For example, a joining assistant having a melting point of about 300° C. which comprises Pb-Sn, Au-Sn, or the like is suitably applied for a polyester-coated wire.

Examples of the joining assistant applicable for an amide-imide-coated wire include those having a melting point of 600° to 750° C., for example, a joining assistant comprising 15% of Ag, 3.5% of P, 9.5% of Sn, and 0.5% of Au with the balance being Cu (P-containing solder having a melting point of about 600° C.), a joining assistant comprising 45% of Ag, 16% of Zn, and 24% of Cd with the balance being Cu (silver solder having a melting point of about 620° C.), and a joining assistant comprising 56% of Ag, 17% of Zn, and 5% of Sn with the balance being Cu (silver solder having a melting point of about 650° C.).

Among them, the P-containing solder requires no flux and, therefore, can eliminate the need for conducting washing after joining, which renders it advantageous from the economic viewpoint.

There are many possible materials for the conductive terminal. Among them, Cu, brass, bronze, Cu-Ni, Cu-Ni-Ag, soft steel, SUS steel, etc. can be used. In consideration of a combination of the conductive terminal with the joining assistant, when the conductive terminal is made of brass, the joining assistant is preferably a P-containing solder, while when the conductive terminal is made of soft steel or SUS steel, the joining assistant should be a silver solder.

The above-described joining assistants may be applied by any ordinary method. Various methods can be used for this purpose, and examples thereof include a method which comprises preparing a paste from a powdery joining assistant and applying the paste to the conductive terminal, a method comprising spraying a powdery joining assistant through flame spray, a method which comprises wrapping a foil-shaped joining assistant, a method in which a conductive terminal is previously clad with a foil-shaped joining assistant, and a method of hot dipping etc.

Since the metallic joining conductive layer between the core wire of the insulated wire and the conductive terminal can be formed according to the present invention, the joined body prepared according to the present invention exhibits an excellent joining strength and a low electrical resistance and can be used stably as a conductor (joined body) for a long period of time.

BRIEF DESCRIPTION OF THE DRAWINGS

FIGS. 1a to 1b and 1c are schematic cross-sectional views of a fundamental embodiment of the present invention;

FIGS. 2a, 2b and 2c are schematic diagrams showing the applied current in the electric heating and pressing;

FIGS. 3a, 3b and 3c are schematic diagrams showing the applied pressure is the electric heating and pressing; and FIG. 4 is a joined body obtained according to the joining method through the present invention.

DESCRIPTION OF THE INVENTION:

One embodiment of a method of joining an insulated wire to a conductive terminal according to the present invention and a joined body prepared by the above method will now be described.

A fundamental joining method is shown in FIGS. 1a, 1b and 1c. FIG. 1a is a schematic view of a sate of assembly of the parts. A U-shaped conductive terminal 3 is interposed between an upper electrode 1 and a lower electrode 2, and a joining assistant 4 is previously applied to those sides of the conductive terminal 3 between which an insulated wire 5 is to be placed.

The insulated wire 5 is placed therebetween. The insulated wire 5 is composed of an insulating coating 6 and a core wire 7 made of Cu. In this case, the applied pressure $P_a$ and the supplied current for welding $I_a$ are both null. (see FIG. 2a and FIG. 3a).

FIG. 1b is a schematic view showing a state of a first-stage electric heating and pressing. First of all, a pressure $P_b$ is applied to the conductive terminal 3, which causes a current $I_b$ to flow in the conductive terminal 3 and the conductive terminal 3 to be heated. (see FIG. 2b and FIG. 3b). This brings about carbonization of the insulating coating 6 of the insulated wire 5.

The insulating coating 6 of the insulated wire 5 is heated at a temperature slightly above the carbonization temperature. At that time, the joining assistant 4 is also melted. The molten joining assistant 4 wets the conductive terminal 3 and the Cu core wire 7 of the insulated wire 5 to bring about partial metallic joining conductive layer 8 between the Cu core wire 7 of the insulated wire 5 and the conductive terminal 3.

FIG. 1c is a schematic view of a state of a second-stage electric heating and pressing. A pressure $P_c$ is applied to the conductive terminal 3, which causes a current $I_c$ to flow in the conductive terminal 3 and the conductive terminal 3 to be heated. (see FIG. 2c and FIG. 3c). In this stage, the wetting with the joining assistant 4 further proceeds, and the carbonized insulating coating 6 of the insulated wire 5 is expelled together with an excessive joining assistant 4 from the joining area.

When this stage is completed, the metallic joining conductive layer 8 (also referred to as "metallurgical joining conductive layer") between the conductive terminal 3 and the Cu core wire 7 of the insulated wire 5 exposed through breaking of the insulating coating 6 of the insulated wire 5 is accomplished.

EXAMPLE 1

BsP3 (JIS brass) comprising 59.0 to 62.0% of Cu with the balance being Zn was used as a conductive terminal 3, and an amide-imide-coated wire having a Cu core wire was used as an insulated wire 5. A joining assistant 4 comprising a P-containing solder composed of 15% of Ag, 3.5% of P, 9.5% of Sn, and 0.5% of Au with the balance being Cu (melting point: about 600° C.) was applied in paste form to the conductive terminal 3, and joining was conducted with a resistance welder by electric heating and pressing.

EXAMPLE 2

A cold-rolled steel sheet of Ni-plated soft steel was used as a conductive terminal 3, and an amide-imide-coated wire having a Cu core wire was used as an insulated wire 5. A 50 μm-thick foil comprising BAg-7 (JIS) composed of 56% of Ag, 17% of Zn, and 5% of Sn with the balance being Cu (melting point: about 650° C.) was used as a joining assistant 4, and joining was conducted with a resistance welder by electric heating and pressing.

EXAMPLE 3

Joining of an insulated wire to a conductive terminal was conduced with a resistance welder by electric heating and pressing in the same manner as that of Example 1, except that use was made of a combination of the same conductive terminal 3 as that of Example 1.

Namely, a conductive terminal 3 comprises BsP3 (JIS brass), an insulated wire 5 comprises a polyester-coated wire having a Cu core wire and a joining assistant 4 comprises a low temperature solder material composed of 5% of Sn with the balance being Pb (melting point: about 320° C.) with which the conductive terminal 3 had been coated by hot dipping.

EXAMPLE 4

BsP2 (JIS brass) comprising 64.0 to 68.0% of Cu with the balance being Zn was used as a conductive terminal 3, and an amide-imide-coated wire having a Cu core wire was used as an insulated wire 5. A joining assistant 4 comprising a P-containing solder composed of 14.0 to 16.0% of Ag, 4.8 to 5.3% of P with the balance being Cu (melting point: about 700° C.) was applied in cladding form to the conductive terminal 3, and joining was conducted with a resistance welder by electric heating and pressing.

EXAMPLE 5

Cu was used as a conductive terminal 3, and an amide-imide-coated wire having a Cu core wire was used as an insulated wire 5. A joining assistant 4 comprising a P-containing solder composed of 4.7 to 6.3% of Ag, 6.8 to 7.7% of P with the balance being Cu (melting point: about 720° C.) was applied in frame spray form to the conductive terminal 3, and joining was conducted with a resistance welder by electric heating and pressing.

COMPARATIVE EXAMPLE 1

Connecting of an insulated wire to a conductive terminal was conducted with a resistance welder in the same manner as that of Example 1, except that no P-containing solder was applied.

COMPARATIVE EXAMPLE 2

Connecting of an insulated wire to a conductive terminal was conducted in the same manner as that of Example 2, except that no joining assistant in foil form comprising BAg-7 (JIS) was used.

The joined body or the connected body prepared by joining or connecting in the foregoing Examples and Comparative Examples were each subjected to a tensile test. In the tensile test, the upper portion of the insulated wire projecting from the conductive terminal was cut to determine true joining or connecting strength as much as possible because otherwise the projection portion of the insulated wire might bring about a necking effect.

As a result, it was found that the connected body wherein no joining assistant was used, i.e., the comparative connected body, causes the insulated wire to be pulled out of the connected area, viz., exhibits an insufficient connecting strength.

On the other hand, the joined body wherein the joining assistant according to the present invention was used brought about breaking of the insulated wire in all of the Examples, viz. had a surely joined area and exhibited a high joining strength.

The microscopic observation of the state of the connected area has revealed that the connected bodies prepared in the comparative Examples have black lines indicating poor connecting at the connecting interface between the conductive terminal and the core wire of the insulated wire, and no metallic joining conductive layer was observed in the connected bodies prepared in the Comparative Examples.

On the other hand, in all of the joined bodies prepared according to the present invention, the joining assistant of several μm was present at the joining interface, and the metallic joining conductive layer between the conductive terminal and the core wire of the insulated wire through the joining assistant was observed.

With respect to the joined body prepared in Example 3 wherein a joining assistant comprising Pb-5% Sn, Pb was absent at the joining interface although a layer formed by a reaction of Sn with both matrices the core wire of the insulated wire and the conductive terminal was present at the joining interface.

That is, Pb which difficulty reacts with the conductive terminal and the insulated wire was expelled from the joined area by the application of pressure. It was also confirmed that the melting point of the joining interface was raise to a point exceeding 320° C., i.e., the melting point of the original joining assistant, that is, this joining interface contributes to an improvement in the thermal resistance.

The reason why the joined bodies according to the present invention exhibit stable joining strength in the above-described tensile test resides in that sufficient metallic joining conductive layer (metallurgical joining conductive layer) is formed through the joining assistant.

Further, with respect to the electrical properties, it was found that in this state, the joined body consistently exhibited very low electrical resistance.

When other conductive terminals such as SUS or Ni-Ag is used in combination with a joining assistant having a melting point corresponding to the carbonization temperature of the insulating coating of the insulated wire, an excellent joining can be attained and the resultant joined body is stable even when used for a long period of time by virtue of the sufficient metallic joining conductive layer between the core wire of the insulated wire and the conductive terminal.

In the embodiments of the present invention, P (phosphorus) in P-containing solder having a film thick about 20-100 μm works as flux function. Therefore, even when Cu core in the insulated wire is oxidized, P (phosphorus) generates phosphid in combination with oxygen in the oxidizing film. The surface of the joined body is made clean an the wetting property of the solder can be promoted. Accordingly, the joined body having high joining strength can be obtained.

We claim:

1. A method of joining an insulated wire to a conductive terminal which comprises placing an insulated wire (5) comprising an insulating coating (6) and a core wire (7) between both sides of a conductive terminal and causing a current to flow between said both sides of said conductive terminal (3) while pressing said conductive terminal (3) after a joining assistant (4) comprising a metal is applied to a joining area of said core wire (7) of said insulated wire (5) or said conductive terminal (3), said insulating coating (6) of said insulated wire (5) is removed and said joining assistant (4) is melted through electric heating thereby bringing about a metallic joining conductive layer (8) between said core wire (7) of said insulated wire (5) and said conductive terminal (3), characterized in that said conductive terminal (3) comprises Cu alloy, thereby bringing about said metallic joining conductive layer (8) between said core wire (7) of said insulated wire (5) and said Cu alloy conductive terminal (3).

2. A method of joining an insulated wire to a conductive terminal according to claim 1, characterized in that said joining assistant (4) to be applied is selected from among metals having a melting point corresponding to a temperature for removing said insulating coating (6) of said insulated wire (5).

3. A method of joining an insulated wire to a conductive terminal according to claim 1, characterized in that when said insulated wire (5) is a high heat resisting wire having Cu core wire (7), said joining assistant (4) comprises a component having a melting point of 600° to 750° C. selected from among Cu, Ag, Sn, P, Zn, Cd, and Au elements.

4. A method of joining an insulated wire to a conductive terminal according to claim 1, characterized in that when said insulated wire (5) is a low heat resisting wire having Cu core wire (7), said joining assistant (4) comprises a component having a melting point of 280° to 400° C. selected from among Pb, Sn, Ag, Cd, Sb, and Au elements.

5. A method of joining an insulated wire to a conductive terminal which comprises placing an insulated wire (5) comprising an insulating coating (6) and a core wire (7) between both sides of a conductive terminal (3) and causing a current to flow between said both sides of said conductive terminal (3) while pressing said conductive terminal (3), after a joining assistant (4) comprising a metal is applied to a joining area of said core wire (7) of said insulated wire (5) or said conductive terminal (3), said insulating coating (6) of said insulated wire (5) is removed and said joining assistant (4) is melted through electric heating, thereby bringing about a metallic joining conductive layer (8) between said core wire (7) of said insulated wire (5) and said conductive terminal (3), characterized in that said conductive terminal (3) comprises Cu or Cu alloy, said insulated wire (5) is a high heat resisting wire having Cu core wire (7), said joining assistant (4) comprises a P-containing solder, and thereby bringing about said metallic joining conductive layer (8) between said Cu core wire (7) of said high heat resisting wire (5) and said Cu or Cu alloy conductive terminal (3).

6. A method of joining an insulated wire to a conductive terminal according to claim 5, characterized in that said P-containing solder (4) comprises at least one selected from Ag, Sn, Cu, Zn and Ni.

7. A method of joining an insulated wire to a conductive terminal according to claim 5, characterized in that said conductive terminal (3) comprises Cu alloy comprising at least one selected from brass, bronze, Cu-Ni, and Cu-Ni-Ag.

8. A method of joining an insulated wire to a conductive terminal according to claim 5, characterized in that said P-containing solder (4) is disposed on said joining area by a method at least one selected from cladding, flame spray, ion injecting, and hot dipping, and a film thick of said P-containing solder (4) has about 20–100 μm.

9. A method of joining an insulated wire to a conductive terminal which comprises placing an insulated wire (5) comprising an insulating coating (6) and a core wire (7) between both sides of a conductive terminal (3) and causing a current to flow between said both sides of said conductive terminal (3) while pressing said conductive terminal (3), after a joining assistant (4) comprising a metal is applied to a joining area of said core wire (7) of said insulated wire (5) or said conductive terminal (3), said insulating coating (6) of said insulated wire (5) is removed and said joining assistant (4) is melted through electric heating, thereby bringing about a metallic joining conductive layer (8) between said core wire (7) of said insulated wire (5) and said conductive terminal (3), characterized in that said insulated wire (5) is a high heat resisting wire having Cu core wire (7), said conductive terminal (3) is made of brass, said joining assistant (4) comprises a P-containing solder, and thereby bringing about said metallic joining conductive layer (8) between said Cu core wire (7) of said high heat resisting wire (5) and said brass conductive terminal (3).

10. A method of joining an insulated wire to a conductive terminal which comprises placing an insulated wire (5) comprising an insulating coating (6) and a core wire (7) between both sides of a conductive terminal (3) and causing a current to flow between said both sides of said conductive terminal (3) while pressing said conductive terminal (3), after a joining assistant (4) comprising a metal is applied to a joining area of said core wire (7) of said insulated wire (5) or said conductive terminal (3), said insulating coating (6) of said insulated wire (5) is removed and said joining assistant (4) is melted through electric heating, thereby bringing about a metallic joining conductive layer (8) between said core wire (7) of said insulated wire (5) and said conductive terminal (3), characterized in that said insulated wire (5) is a high heat resisting wire having Cu core wire (7), said conductive terminal (3) is made of soft steel or SUS steel, said joining assistant (4) comprises a silver solder, and thereby bringing about said metallic joining conductive layer (8) between said Cu core wire (7) of said high heat resisting wire (5) and said steel conductive terminal (3).

11. A method of joining an insulated wire to a conductive terminal which comprises placing an insulated wire (5) comprising an insulating coating (6) and a core wire (7) between both sides of a conductive terminal (3) and causing a current to flow between said both sides of said conductive terminal (3) while pressing said conductive terminal (3), after a joining assistant (4) comprising a metal is applied to a joining area of said core wire (7) of said insulated wire (5) or said conductive terminal (3), said insulating coating (6) of said insulated wire (5) is removed and said joining assistant (4) is melted through electric heating, thereby bringing about a metallic joining conductive layer (8) between said core wire (7) of said insulated wire (5) and said conductive terminal (3), characterized in that said insulated wire (5) is a high heat resisting wire having Cu core wire (7), said conductive terminal (3) is made of Ni-plated soft steel, said joining assistant (4) comprises a silver solder, and thereby bringing about said metallic joining conductive layer (8) between said Cu core wire (7) of said high heat resisting wire (5) and said steel conductive terminal (3).

12. A method of joining an insulated wire to a conductive terminal which comprises placing an insulated wire (5) comprising an insulating coating (6) and a core wire (7) between both sides of a conductive terminal (3) and causing a current to flow between said both sides of said conductive terminal (3) while pressing said conductive terminal (3), after a joining assistant (4) comprising a metal is applied to a joining area of said core wire (7) of said insulated wire (5) or said conductive terminal (3), said insulating coating (6) of said insulated wire (5) is removed and said joining assistant (4) is melted through electric heating, thereby bringing about a metallic joining conductive layer (8) between said core wire (7) of said insulated wire (5) and said conductive terminal (3), characterized in that said insulated wire (5) is a high heat resisting wire having Cu core wire (7), said conductive terminal (3) is made of brass, said joining assistant (4) comprises a Sn-containing solder, and thereby bringing about said metallic joining conductive layer (8) between said Cu core wire of said high heat resisting wire (5) and said brass conductive terminal (3).

* * * * *